United States Patent Office 3,350,302
Patented Oct. 31, 1967

3,350,302
CLARIFICATION OF SURFACE WATERS
László Demeter, Béla Galgóczi, Emma Bozzay, and István Zagyvai, Budapest, Hungary, assignors to Nikex Nehézipari Külkereskedelmi Vallalat, Budapest, Hungary
Filed Sept. 16, 1964, Ser. No. 396,895
7 Claims. (Cl. 210—45)

ABSTRACT OF THE DISCLOSURE

A process is disclosed for clarifying surface waters, or live waters to render them potable. The water to be purified is introduced into a clarification system where sand and polyelectrolyte, suitably also an inorganic flocculating agent are added to the water. The rather small amount of generally inorganic solids content of surface waters is sedimented together with the aforementioned additions, and thus separated from the now pure water. The sand is subsequently separated from the other solid constituents, excepting such chemicals as are retained on the surface of the sand, in a separator such as a hydrocyclone and the thus reactivated sand can be recirculated for reuse. An important feature of the process is that the sand can be substantially quantitatively recovered during or after the reactivation step, whereby hardly any or even no replenishing of the sand in the system is needed.

---

Figure 1:
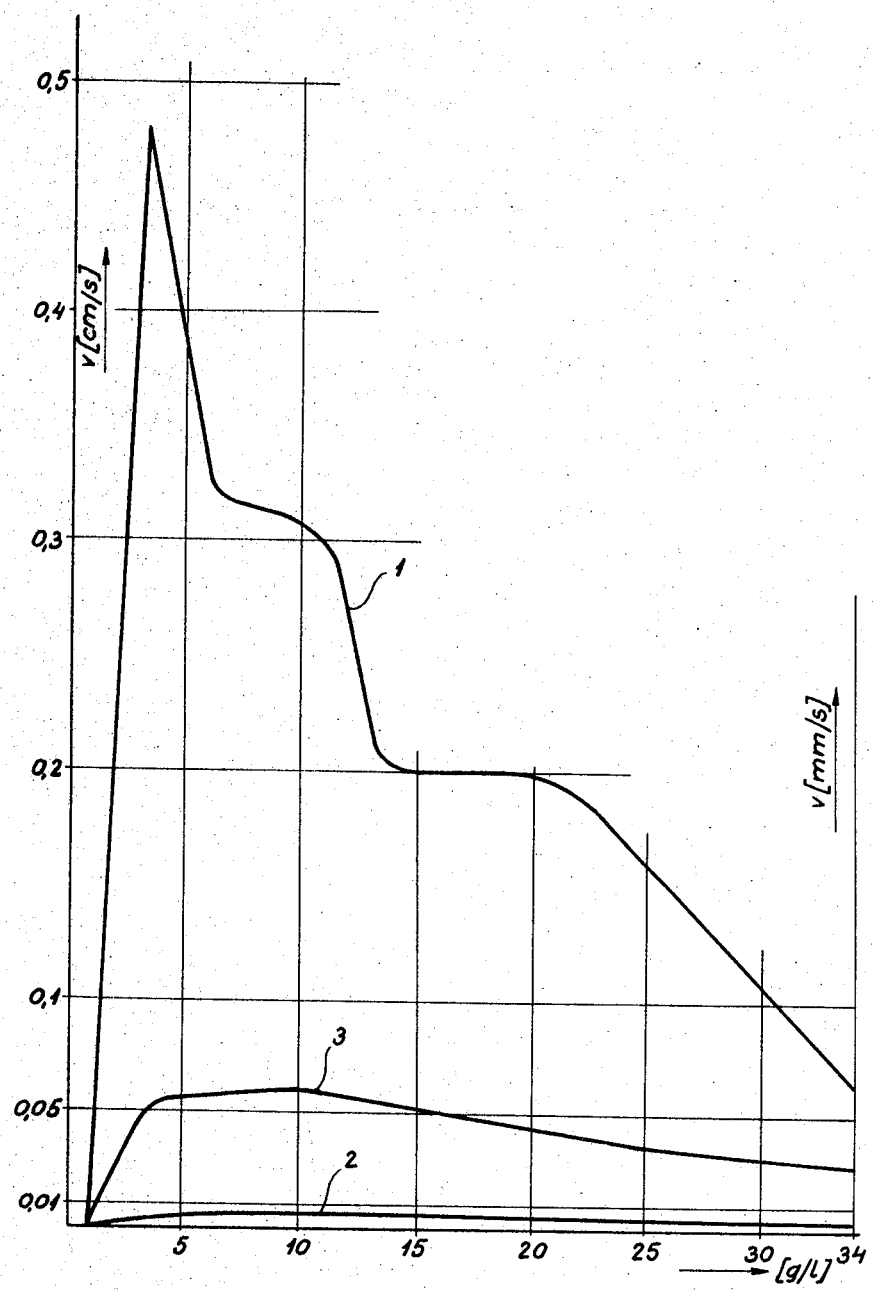

This invention relates to a process for the clarification and purification of surface waters and industrial waters containing suspended materials. Demand for drinking water and industrial water continuously increases, and this poses increasing difficulties in supply problems. The supply of ground water is limited and, therefore, in most settlements artificially purified surface water must be used.

Surface or live waters contain suspended materials of different particle sizes and their rapid and effective removal requires complicated procedures and is uncertain when attempted by known methods. In water purification technology, various clarification methods involving the use of chemicals, have become known.

In clarification systems using vertical or horizontal flow direction, pre-purification plants are generally used before the actual clarification. Aluminum sulfate, ferric sulfate and similar compounds are generally used as clarification chemicals, which act as precipitation agents and coagulants. A disadvantage of using these chemicals according to the prior art is that the degree of activity of the precipitation agents is not satisfactory, since the water to be purified leaves the clarification system still having a high degree of cloudiness. Moreover, the state of equilibrium is extremely unstable and a very small variation in the purification parameters, such as flow velocity, water temperature, and sludge removal, and a small variation in the amount or kind of the suspended materials in the water, renders the effectiveness of the clarification system uncertain. Because of the difficulties in controlling the purification process, the quantity of pure water produced, constantly varies. Therefore, continuous production of desired quantity of water having a constant quality, cannot be accomplished by use of known chemical water purification methods.

The process according to the present invention eliminates most of the above drawbacks of the prior art processes, and by use of the process of the invention good quality purified water can be continuously obtained. The process does not depend on a change of the properties of the untreated water and on small variations in the chemical additives, and provides economical and safe operation which can be readily carried out in existing water purification systems. As a further advantage it should be noted that the use of the process of the invention in existing water purification plants can lead to an increase in purification capacity by a factor of approximately 3 or 4, compared to that which can be achieved with known processes.

According to the invention a process is provided for the clarification and purification of surface and industrial waters containing suspended materials, whereby a polyelectrolyte and a particulate, hard, non-porous clarification adjuvant are added to the water to be treated, thereafter the solids are separated from the water, such as by filtration, and the adjuvant is regenerated for re-circulation.

Quartz sand is a preferred example of the particulate, hard, non-porous clarification adjuvant to be used in accordance with the invention. The particle size of the adjuvant is preferably 100–200 microns and the specific surface of the material is preferably 100–500 cm.$^2$/g., determined by the Lea-Nurse method, as described in the ASTM Bulletin, 1943, p. 123. The polyelectrolyte preferably has a polymerization degree higher than 500, the functional groups of which have a molcohesive increment of 5–20K/mol.

Preferably a hydrocyclone battery is used for the regeneration of the particulate, hard, non-porous clarification adjuvant.

The process of the invention is based on the following discoveries.

Various polyelectrolytes were added to suspensoid systems, i.e. water which contains suspended particles, and the efficiency of the clarification was examined. It was found that there is a minimum solids concentration, or limiting concentration below which even the most effective polyelectrolyte is incapable of exerting any clarification activity.

If solid and compact substances having a small specific surface area, such as fine quartz sand, are used together with the polyelectrolyte, it was surprisingly discovered that even dilute suspensions which have a solids content less than the above-mentioned minimum concentration, can be clarified within a short time and with good efficiency.

The degree of clarification can be further increased and the quantity of polyelectrolyte decreased if, beside the polyelectrolyte, other chemicals are used such as coagulants which are known to be used by themselves for clarification.

The clarification adjuvant, e.g. quartz sand, can be regenearted, such as by hydrocyclone battery, and recycled for re-use.

The above discoveries are based on laboratory and field tests.

The first series of tests was carried out to determine the limiting concentration, as defined above. In glass cylinders of the same weight and the same cross section a column of sludge was adjusted in each to a height of 30 cm. Suspensoid systems of various densities were prepared by distributing clay in water in increasing degrees of dispersion. Clarification efficiency was determined without and with polyelectrolyte.

In those glass cylinders in which no sharp phase limit could be observed between the sludge and the clarified liquid above it, the speed of clarification was defined by the rate of increase of the length of the clarified portion. In those glass cylinders in which no phase boundary is formed at all during clarification, i.e. in sludges having a very small solids concentration, the degree of clarification efficiency was determined by taking samples from time to time, evaporating the liquid, and weighing the remaining solids. Clarification can also be measured by the light transmission of the liquid column. The results thus obtained are illustrated in Table I and the accompanying drawing. In FIG. 1, the clarification rate is plotted as a function of sludge concentration; curve 1 representing the suspension treated with polyelectrolyte, and curve 2 representing the suspension not treated with polyelectrolyte. Curve 3 contains the same data as curve 2, but on a 10 times enlarged scale. The results obtained clearly show that a steeply rising maximum appears at a solids content of 3 g./l. in the clarification rate in the polyeletrolyte-treated sample. If the solids content is further reduced, clarification rate suddenly drops to zero.

clarification adjuvant having a high speed of sedimentation, gathers substantial amounts of activated fine particles suspended in the dispersion, whereby the clarification rate of the suspensoid system is increased. The overall sedimentation proceeds at the same speed of sedimentation as that of the conglomerate formed by the introduced adjuvants. During sedimentation, a thickening of the suspension, characteristic of network structure, results due to the orthokinetic effect brought about by mechanical movement, and the perikinetic effect introduced by the chemicals.

TABLE I

| Solids content, g./l. | Clarification rate, cm./sec. | | Solids content in g./l. of clarified water column after 1 hour | | | |
|---|---|---|---|---|---|---|
| | With polyelectrolyte | W/o polyelectrolyte | W/o polyelectrolyte | With polyelectrolyte | With adjuvant | With adjuvant and polyelectrolyte |
| 35 | 0.0027 | 0.053 | | | | |
| 23 | 0.0038 | 0.18 | 0.19 | 0.0 | | |
| 17.5 | 0.0046 | 0.20 | 0.13 | 0.0 | | |
| 14 | 0.0054 | 0.20 | | | | |
| 11.5 | 0.0058 | 0.29 | 0.26 | 0.0 | | |
| 10.0 | 0.0060 | 0.31 | 0.11 | 0.0 | | |
| 6.4 | 0.0058 | 0.32 | 0.18 | 0.0 | | |
| 3.3 | 0.0054 | 0.48 | 0.35 | 0.0 | | |
| 0.7 | Not measurable. | | 0.24 | 0.09 | 0.28 | [1] 0.0 |
| 0.35 | Opalescent w/o clarification. | | 0.14 | 0.08 | 0.15 | [1] 0.0 |

[1] Clear in under 10 mins.

A maximum in the clarification rate curve is also noticeable in the case of the suspension treated with conventional chemicals only (not shown), but this maximum is not steeply rising but extended. Both curves have a common point at which the speed of clarification is zero.

This clearly shows that in the very low solids-containing suspensoid systems, and consequently in the clarification of surface waters and industrial waters containing solid suspended materials, sludge density has a limiting concentration and below this limiting value no substantial clarification can be accomplished.

Treatment with chemicals alone is not sufficient in the case of surface waters, since these generally have a low solids content. In highly disperse suspensions chemicals, such as polyelectrolytes, are incapable of combining the particles into aggregates, consequently the coagulation of aggregates into conglomerates does not take place either and, therefore, the development of a considerable rate of sedimentation, according to Stokes' law, cannot be expected.

It has now been found that if, simultaneously with polyelectrolytes, crystal nuclei or the like are introduced into the system, which due to their size and their specific gravity have a considerable settling rate, by way of orthokinetic coagulation, coagulation of the fine particles can also be accomplished. These nucleating adjuvants by the aid of which sedimentation rate of the fine particles can be considerably increased, are referred to herein as particulate, hard, and non-porous clarification adjuvants or accelerators. Although the speed of clarification can be considerably increased by the simultaneous addition of conventional chemicals and clarification adjuvants, an optimum result can be obtained only in cases in which, according to the present invention, polyelectrolytes are used simultaneously with a clarification adjuvant.

The polyelectrolyte molecules become attached by their functional groups probably in part to the highly dispersed and non-settling or very slowly settling particles, and in part, to the particulate, hard, and non-porous clarification adjuvant added to the solution with the polyelectrolyte. The surface of the floating substances in the dispersion can be said to be activated. The rapid progress of the above postulated mechanism is induced by the orthokinetic coagulation. The particulate, hard, non-porous The limiting solids concentration necessary for the formation of the crosslinked network structure is affected by the nature of the chemicals used, such as by the degree of polymerization of the polyelectrolyte, the activity of the functional groups of the polyelectrolyte, etc. The time necessary for the formation of the network structure is determined by particle size, the quantity, and most important, by the surface properties of the fine-grained substance used as clarification adjuvant.

The second test series was carried out in order to determine which factors have the greatest effect upon the efficiency of the material used for the clarification. In these tests, coarse, fine and micro-fine pumice, as well as various particle size and specific surface fractions of quartz sand were used. The classification of the material used was carried out with the aid of sieves or hydrocyclones. The particle size and specific properties of the materials used are shown in the following table.

| | | Particle Size (microns) | Specific Surface (cm.$^2$/g.) Approx. |
|---|---|---|---|
| I | Coarse pumice | 30–200 | 1,500 |
| II | Fine pumice | 30–100 | 2,000 |
| III | Micro-pumice | 15–100 | 7,000 |
| IV | Quartz sand | 30–100 | 220 |
| V | Quartz sand | 15–30 | 500 |
| VI | Quartz sand | 0–20 | 900 |

A chain polymer-polyelectrolyte having a polymerization degree of 10,000–70,000 and molcohesive increment of 5–14K/mol was used as coagulating agent or flocculant. Such materials are sold e.g. by the Dow Chemical Company under the trademark Separan NP10; another is a copolymer of acrylamide and acrylic acid, with a water soluble component of 50%, sold under the trademark Sedosan. The suspension systems examined were river water with a solids concentration of 300 g./m.$^3$, and 50 g./m.$^3$, and river sludges with a solids concentration of 1300 g./m.$^3$. The experiments are described in the following:

(a) First a polyelectrolyte and a particulate, hard, non-porous clarification adjuvant were added in equal amounts separately as well as together to the system to be used for clarification. The results obtained were compared with the results of controls in which 60 g./m.³ aluminum sulfate was used. In this series of tests 10 g./m.³ of polyelectrolyte and 2 kg./m.³ of clarification adjuvant were used. The solids content of the untreated starting suspension was 0.36 g./l. The results obtained are given in Table II. From these data it can be seen that the best results can be obtained by the joint addition of quartz sand IV as adjuvant and of polyelectrolyte.

(b) Further experiments were carried out in order to determine the optimum concentration of the kind of clarification adjuvant which has been found to give the best results, and of the polyelectrolyte. The results obtained are given in Tables III and IV, Table III representing clarification runs on river water having a solids content of 50 g./m.³ and Table IV representing clarification runs on river slurry with a solids content of 1300 g./m.³. It can be seen that optimum clarification can be obtained in the static system, by addition of 3–4, kg./m.³ quartz sand IV and of 10–20 g./m.³ polyelectrolyte.

TABLE II

| Polyelectrolyte or Control | G./m.³ | Adjuvant | Kg./m.³ | Solids in g./l. after— | | Remarks |
|---|---|---|---|---|---|---|
| | | | | 30 mins. | 60 mins. | |
| W/o additives | | | | 0.34 | 0.254 | Cloudy after 10 hrs. |
| $Al_2(SO_4)_3$ | 60 | | | 0.36 | 0.25 | Do. |
| Separan NP10 | 10 | | | 0.234 | 0.19 | Clear after 2 hrs. |
| Sedosan II | 20 | | | 0.24 | 0.19 | Do. |
| | | Pumice II | 2 | 0.262 | 0.238 | Cloudy after 10 hrs. |
| | | Pumice III | 2 | 0.246 | 0.224 | Do. |
| | | Quartz Sand IV | 2 | 0.25 | 0.22 | Do. |
| $Al_2(SO_4)_3$ | 50 | Pumice II | 2 | 0.266 | 0.246 | Do. |
| $Al_2(SO_4)_3$ | 60 | Pumice III | 2 | 0.33 | 0.278 | Do. |
| $Al_2(SO_4)_3$ | 60 | Quartz Sand IV | 2 | 0.29 | 0.242 | Do. |
| Separan NP10 | 10 | Pumice II | 2 | 0.214 | 0.13 | Clear after 30 mins. |
| Do | 10 | Pumice III | 2 | 0.158 | 0.114 | Do. |
| Do | 10 | Quartz Sand IV | 2 | 0.134 | 0.09 | Do. |
| Sedosan II | 20 | do | 2 | 0.142 | 0.10 | Do. |
| $Al_2(SO_4)_3$ | 30 | Pumice II | 2 | 0.262 | 0.19 | Cloudy after 10 hrs. |
| $Al_2(SO_4)_3$ | 30 | Pumice III | 2 | 0.27 | 0.21 | Do. |
| $Al_2(SO_4)_3$ | 30 | Quartz Sand IV | 2 | 0.26 | 0.19 | Do. |
| $Al_2(SO_4)_3$ | 60 | Quartz Sand V | 2 | 0.274 | 0.218 | Do. |
| $Al_2(SO_4)_3$ | 60 | Quartz Sand VI | 2 | 0.36 | 0.33 | Do. |
| Separan NP10 | 10 | Quartz Sand V | 4 | 0.42 | 0.30 | Clear after 5 hrs. |
| Do | 10 | Quartz Sand VI | 4 | 0.50 | 0.38 | Do. |

TABLE III

| Polyelectrolyte or Control | G./m.³ | Adjuvant | Kg./m.³ | Remarks |
|---|---|---|---|---|
| Untreated water | | | | Does ton clarify. |
| $Al_2(SO_4)_3$ | 60 | | | Do. |
| $Al_2(SO_4)_3$ | 60 | Pumice III | 2 | Do. |
| Separan NP10 | 5 | Quartz Sand IV | 1 | Clear after 2 hrs. |
| Do | 10 | do | 1 | Do. |
| Do | 20 | do | 1 | Do. |
| Do | 5 | do | 2 | Do. |
| Do | 10 | do | 2 | Do. |
| Do | 20 | do | 2 | Do. |
| Sedosan | 10 | do | 2 | Do. |
| Do | 20 | do | 2 | Do. |
| Separan NP10 | 5 | do | 4 | Clear in 20 mins. |
| Do | 10 | do | 4 | Clear in 10 mins. |
| Do | 20 | do | 4 | Clear in 15 mins. |
| Sedosan | 10 | do | 4 | Clear in 20 mins. |
| Do | 20 | do | 4 | Clear in 15 mins. |
| Separan NP10 | 10 | Pumice III | 4 | Clear in 30 mins. |
| Do | 10 | Pumice II | 4 | Clear in 40 mins. |
| Do | 10 | Pumice I | 4 | Clear in 1 hr. |

TABLE IV

| Sedosan, g./m.³ | Quartz Sand IV, kg./m.³ | G./l. solids after— | | | Remarks |
|---|---|---|---|---|---|
| | | 2 mins. | 1 hr. | 3 hrs. | |
| Untreated slurry | | 1.30 | 0.272 | 0.19 | Does not clarify. |
| 5 | 1 | 0.196 | | | Do. |
| 20 | 1 | 0.22 | 0.108 | 0.08 | Clear after 3 hrs. |
| 5 | 2 | 0.252 | | | Clear after 1 hr. |
| 20 | 2 | 0.216 | | | Do. |
| 5 | 3 | 0.188 | | | Do. |
| 10 | 3 | 0.132 | 0.05 | 0.02 | Clear after 30 mins. |
| 20 | 3 | 0.244 | | | Do. |
| 5 | 4 | 0.188 | | | Do. |
| 10 | 4 | 0.116 | 0.04 | 0.00 | Clear after 15 mins. |
| 20 | 4 | 0.08 | 0.052 | 0.008 | Do. |
| 5 | 6 | 0.36 | 0.08 | 0.0 | Clear after 1 hr. |
| 10 | 6 | 0.272 | | | Do. |
| 20 | 6 | 0.256 | | | Do. |
| 5 | | 0.088 | | | Clear after 3 hrs. |
| 10 | | 0.20 | 0.15 | 0.132 | Do. |
| 20 | | 0.216 | | | Do. |

By the experiments it was shown that the use of materials having large specific surfaces, i.e. those with a high adsorption capability, has a detrimental effect, because when they are combined with polyelectrolytes, they cannot be economically used for the clarification of suspensoid systems having high degree of dispersion.

It was shown by the experiments that the clarification adjuvant acts not by way of adsorption but by the occurrence of a loose coupling between the chain polymer molecules and the suspended particles. For the formation of this loose coupling, the rounded, smooth, and small specific surface of quartz sand was found to be most suitable. If, instead of quartz sand, an adsorbent having a large specific surface, such as pumice is used, the quantity of the chemicals needed for clarification has to be increased, and even then, in practice, the activity of the chemicals could be completely destroyed by the large specific surface, since the functional groups then become bonded.

The preferred clarification adjuvant to be used in accordance with the invention, is quartz sand having a small specific surface and a particle size of about 20–100 microns. A particular advantage of using quartz sand is its wear-resistance whereby it can withstand the mechanical forces occurring during the regeneration and it can be substantially recovered by a regeneration step in the cycle.

Figure 2:
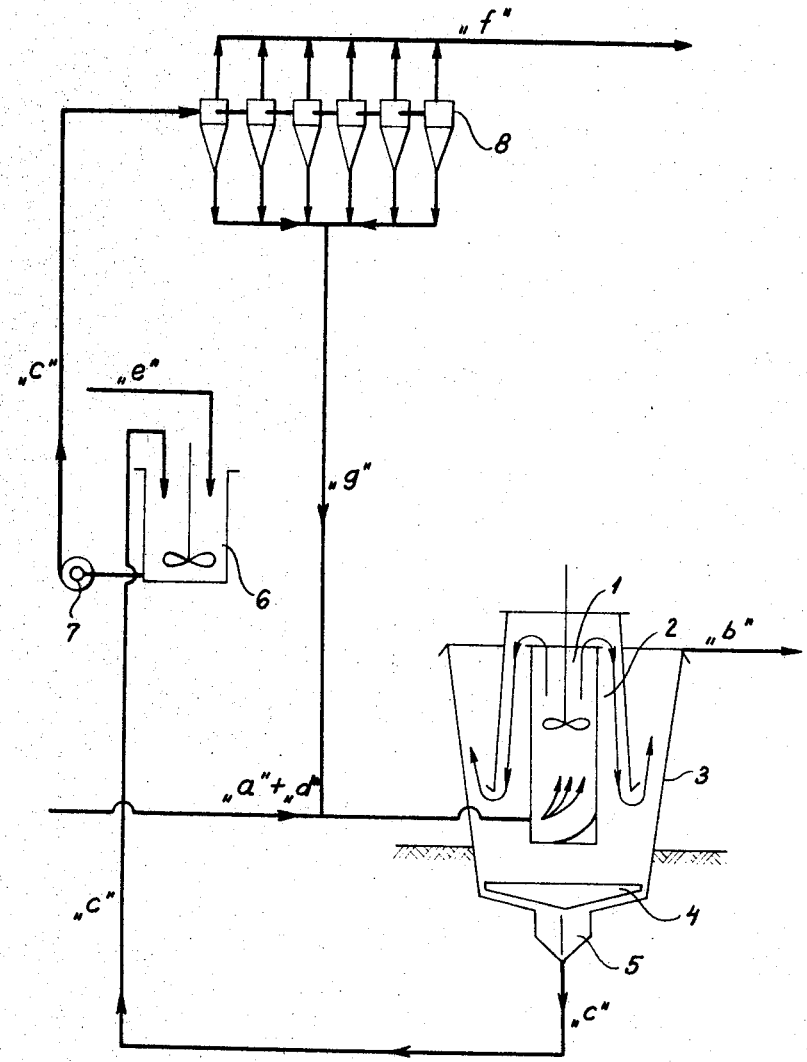

The working scheme of the water clarification process of the invention is described with reference to FIG. 2. The clarification and purification are carried out by filtration of the untreated water which is obtained from the water intake, such as with drum filters, without preliminary sedimentation, then by addition of chemicals, followed by clarification, regeneration of the adjuvant and recirculation thereof, and finally filtration of the clarified water with high-speed filters to separate it from the accumulated solids.

Clarification chemicals are fed to the untreated water which has passed through the drum filter (not shown). After the addition of the chemicals, untreated water $a$ is led via a conduit to a closed bottom cylinder 1 disposed within a clarification reactor 3. Regenerated clarification adjuvant $g$ is recirculated from a cyclone battery 8 to the now chemically treated water. The water to be purified flows into the interior cylinder 1 of the clarification reactor 3 after all auxiliary clarification substances have been added. The water flows from the closed bottom cylinder 1 and overflows into a bell-shaped preclarification chamber 2. The treated water flows at a high velocity over the lower edge of the chamber 2 and then upwardly into the outermost chamber of the clarification reactor. In each of these steps the flow velocity decreases. The clarification adjuvants added to the water become concentrated due to the decrease in flow velocity and the resulting sedimentation, and form a cohesive suspended slurry of high specific gravity and having a network structure. The water thus clarified is then fed to the high-speed filters used in the known processes. Conventional sterilization processes can be used to carry out further purification.

The sludge-containing sand slurry depositing on the bottom of the clarification reactor 3 is led into a sump 5 by means of a continuous scraper 4. The slurry is then fed via a pipe $c$ with the aid of a slurry pump 7, under pressure of 2–2.5 atmospheres gauge to a hydrocyclone battery 8 where the clarification adjuvant is classified according to particle size and specific gravity. The waste materials of the water clarification, including the materials suspended in river water, and metal hydroxides are removed through the overflow outlets $f$ of the hydrocyclones 8, while the granular, chemically activated clarification adjuvant is recovered at the bottom of the hydrocyclones, purified from waste sludge. The clarification adjuvant regenerated in the hydrocyclones, is recirculated with the feed water $a$ treated with chemicals. If the replenishing of any loss of granular clarification adjuvant is desired, additional amounts can be introduced step-wise into the clarification system through a feed hopper 6 provided with a stirrer and via slurry pump 7, the adjuvant being at the same time activated by chemicals.

Further particulars of the clarification process of the invention are described in greater detail in the following example with regard to the preferred flow-sheet of FIG. 2.

In the clarification system, 30 g. anhydrous aluminum sulfate, 4 g. of $FeCl_3$, and 0.3 g. of an acrylamide polyelectrolyte sold by Dow Chemical Co. under the trademark Separan NP10, were added per 1 m.$^3$ of feed water. The clarification system is adapted for the purification of 8,000–10,000 m.$^3$ per day. 8 tons of quartz sand IV were circulated in the cycle, the clarification reactor having a 1,000 m.$^3$ volume. The feed water's suspended materials content was measured with a Pulfrich nephelometer, by which the relative cloudiness of the feed water was determined to be 90–290. The water, after purification according to the invention, had a relative cloudiness of 6–20, in the average 14. The clarification system has been used at a capacity of 30–32,000 m.$^3$ per day. The relative cloudiness of the finally filtered water was 2–3.5. The purified water was found satisfactory as regards taste, smell, and biological purity, and its quality was found to be improved in all regards. Compared to waters treated by known methods, the average algae number in the water purified by the process of the invention was lower; in fact, $\frac{1}{10}$ of the algae number was reached by the process of the invention compared to that which was possible to achieve by prior art methods. Flow velocity can be further increased in the clarification system, whereby the capacity of the clarification system can be considerably increased.

Due to the presence of the granular clarification adjuvant, having higher specific gravity, substantially higher flow velocity is to be employed with the process of the invention to keep the slurry in suspension, than is employed in the case of prior art processes using chemical additions. As a result of the higher velocities, the performance of the clarification system is appreciably higher than of comparable prior art systems. The use of granular clarification adjuvants causes a remarkable increase of the sludge density of the slurry suspension, and the slurry suspension particles and the materials suspended in the feed water to be purified become activated by the polyelectrolyte. Due to the combined effect of the polyelectrolyte and the adjuvant, the clarification process of the invention allows the use of substantially higher flow velocities, more intensive clarification is accomplished, and the quality of the purified water is improved. Industrial scale tests were carried out in a continuous flow system. In the continuous flow system the loss of clarification adjuvant which is circulating in the clarification system, decreased to negligible quantities and at the same time the specific quantity of polyelectrolyte used was reduced. According to a preferred embodiment of the invention, inorganic salts containing di- or poly-valent cations, such as aluminum sulfate and ferric chloride or ferric sulfate, generally used in water purification, can be used in substitution for part of the polyelectrolyte.

What we claim is:

1. A process for clarification of surface waters, which comprises admixing to the water in a clarification system a polyelectrolyte and a hard, non-porous sand having a particle size of 10–200 microns and a specific surface of 100–500 cm.$^2$/g., settling, and then separating the settled solids from the water, and regenerating the sand for recirculation without significant loss thereof to the clarification system.

2. The process of claim 1, wherein the surface water to be clarified has a maximum solids content not substantially in excess of about 3 g./l.

3. The process of claim 2, wherein the step of regenerating the sand comprises introducing the settled solids, after the separation thereof from the clarified water, into a hydrocyclone, and substantially completely separating the sand from the component of the settled solids, comprising the solids originally suspended in the water.

4. The process of claim 2, further comprising adding a flocculant along with the polyelectrolyte to the surface water to be clarified.

5. The process of claim 4, wherein the step of regenerating the sand comprises introducing the settled solids, after the separation thereof from the clarified water, into a hydrocyclone, and substantially completely separating the sand from the component of the settled solids, comprising the solids originally suspended in the water.

6. The process of claim 5, wherein said flocculant is an inorganic salt with di- or other polyvalent cations.

7. The process of claim 6, wherein said inorganic salt is aluminum sulfate, ferric chloride, or ferric sulfate.

References Cited

UNITED STATES PATENTS

| | | | |
|---|---|---|---|
| 3,142,638 | 7/1964 | Blaisdell et al. | 210—52 |
| 3,168,419 | 2/1965 | Gale | 127—52 X |

OTHER REFERENCES

Riddick, T. M.: Zeta Potential and Its Application to Difficult Waters, Jour. AWWA, vol. 53, August 1961, pages 1007–1030, pages 1007–1014 particularly relied on.

MICHAEL E. ROGERS, *Primary Examiner.*